United States Patent [19]

Klann

[11] Patent Number: 4,809,951

[45] Date of Patent: Mar. 7, 1989

[54] SPRING COMPRESSOR FOR LARGE COIL SPRINGS

[76] Inventor: Horst Klann, Terra Wohnpark 12, 7730 Villingen-Schwenningen 24, BRD, Fed. Rep. of Germany

[21] Appl. No.: 122,119

[22] Filed: Nov. 17, 1987

[30] Foreign Application Priority Data

Dec. 11, 1986 [DE] Fed. Rep. of Germany ....... 3642355
Jun. 16, 1987 [DE] Fed. Rep. of Germany ....... 3620018

[51] Int. Cl.$^4$ .............................................. B23P 19/04
[52] U.S. Cl. ...................................... 254/10.5; 29/227
[58] Field of Search ................. 254/10.5, 29 A, 29 R, 254/34; 29/227, 259, 256, 264, 266

[56] References Cited

U.S. PATENT DOCUMENTS 4,395,020  7/1983  Spainhour ......................... 254/10.5
4,520,543  6/1985  Ito ........................................ 29/227

FOREIGN PATENT DOCUMENTS

2420963  11/1974  Fed. Rep. of Germany ..... 254/10.5
53-128848  11/1978  Japan ............................... 254/10.5

Primary Examiner—William L. Sikes
Assistant Examiner—Frank González
Attorney, Agent, or Firm—McGlew & Tuttle

[57] ABSTRACT

A spring compressor for large coil springs especially for motor vehicle axle springs comprises first and second disc-like pressure plates which are located at spaced locations along the axis of a cylindrical guide tube and each has a central bore opening. A threaded spindle has a spindle head with a key profile and it is rotatably mounted in an axial thrust bearing of the cylindrical guide tube. The guide tube has a radial support surface on which one of the pressure plates is supported. A cylindrical threaded tube has internal threads insertedly engaged with the threaded spindle and the spindle is connected to the guide tube with an axial mobility so as to rotate with the guide tube. The threaded tube has an end which faces away from the spindle head which has a plurality of radial fingers which fit into corresponding recesses formed in the first pressure plate which includes radial enlargements which form passages for the radial fingers carried by the threaded tube. The fingers of the threaded tube are at least three in number and are substantially wedge-shaped radially extending fingers which taper in a direction away from the spindle head and they engage in a corresponding number of recesses of the second pressure plate. The pressure plate is also provided with enlargements between every two recesses and are countersunk on the exterior of the pressure plate and have diagonal faces shaped so that no planar support surface is present for the fingers outside of the recesses.

21 Claims, 5 Drawing Sheets

SPRING COMPRESSOR FOR LARGE COIL SPRINGS

FIELD AND BACKGROUND OF THE INVENTION

This invention relates in general to spring compressors and in particular to a new and useful spring compressor for large coil springs, especially for motor vehicle axle springs.

In a known spring compressor of this generic type, there is an axially movable groove-spring connection as rotation prevention between the cylindrical guide tube and a cylindrical threaded tube; or in another embodiment, the guide tube is connected without rotational capability to the threaded tube by a radial projection engaged in an axial guide slot (German Pat. No. 33 04 321). In both cases, the threaded tube can be inserted in telescope fashion into the guide tube. In the one form of embodiment, the threaded tube is provided on its outer surface with at least one axial groove open at both ends, in which is engaged a grooved bar spring or a tenon block fastened in, or on, the guide tube with axial mobility. In another form of embodiment, the radial projection is placed on the end of the threaded tube toward the spindle head. It is engaged in an axial guide slot of the guide tube open at the front, extending approximately over the entire length of the guide tube. In both forms of embodiment, the length of the guide tube can be either the same as the length of the guide spindle, or smaller. Each of the pressure plates is provided with a central bore whose diameter is slightly larger than the outside diameter of the guide tube, so that both pressure plates can be pushed over the guide tube. The threaded tube is provided with two diametrically opposite radial fingers whose radial length is larger than the radius of the central bore. Correspondingly, the recesses that are provided on the outside of the pressure plate away from the spindle head to hold the radial fingers of the threaded tube and prevent rotation are also arranged in diametrically opposite positions. Accordingly, the two radial enlargements in the pressure plate away from the spindle head, through which the radial fingers can be pushed in the axial direction, are also arranged diametrically opposite. Because of this diametrically opposite arrangement, both of the enlargements and of the recesses at the edge of the bore opening, there is a support surface in each case on the outside in the intermediate edge sections on which the radial fingers can rest without thereby being secured against rotation. This produces the risk of the rotation of the pressure plate relative to the threaded tube or to the radial fingers; this can lead to the radial fingers reaching the enlargements again by such a rotation during the compression of a spring or when handling a compressed spring, and thus being able to release the pressure plate.

SUMMARY OF THE INVENTION

The invention is to provide a spring compressor constructed in a simple way so that the possibility of accidental risk in use is reliably eliminated. A tensile connection between the threaded tube and the pressure plate, away from the spindle head, is possible only when the radial fingers of the threaded tube are located in the outside recesses of the pressure plate and are secured against rotation.

Pursuant to the invention the threaded tube has at least three essentially wedge-shaped radial fingers arranged at equal angular distances from one another at its end away from the spindle head. Recesses are present in an equal number on the outside of the pressure plate away from the spindle head. In addition radial enlargements of the bore opening between each two recesses are countersunk and provided with diagonal faces on the outside, so that at least in the radial area of the radial fingers, there is no flat planar support surface for them outside of the recesses.

A particular advantage is thus produced by eliminating any flat planar support surfaces on the outside of the pressure plate in the radial area of the radial fingers. Because of the wedge-shaped design of the radial fingers themselves, the formation of a tensile connection between the threaded tube and the pressure plate is possible only with the simultaneous formation of a lock fit secure against rotation between the radial fingers and the pressure plate. Furthermore, the location of the outside recesses in which the radial fingers have to be introduced is substantially facilitated by the diagonal face edges of the recesses. This also makes handling simpler.

A further simplification and facilitation of handling is produced by making the width of the bore opening in the pressure plate away from the spindle head in harmony with the diameter of the threaded tube, and with radial guidance produced also between the pressure plate and the threaded tube, which results in the centering of the threaded tube in the bore opening practically by itself.

While in the known spring compressor (German Pat. No. 33 04 321) either the guide tube or only the grooved torsion bars have to be of the same length as the threaded spindle, and the pressure plate away from the spindle head must be able to move either over the guide tube or over the grooved torsion bars in order to produce the maximum compression stroke, it is necessary for the bore opening of the pressure plate to have either an inside diameter conforming to the outside diameter of the guide tube, or in case of double-grooved torsion bars to have a radial enlargement conforming to them. In the one case, it is not possible to harmonize the width of the bore opening with the diameter of the threaded tube, because the threaded tube is considerably smaller than the diameter of the guide tube, and in the other case it would not be possible to design the pressure plate away from the spindle head. Because of the additional bore enlargements for the two grooved torsion bars, the diagonal guide surfaces, that are located on both sides of the recesses and provided for the passage of the radial fingers, would be interrupted, so that the radial fingers would no longer necessarily slide into the bore enlargements or into the recesses. This drawback is eliminated in accordance with one construction of the invention.

A particularly simple prevention of rotation is affected by the invention between the guide tube and the clutch tube and between the clutch tube and the threaded tube, which at the same time still permits good guidance characteristics between the clutch tube and the guide tube or the threaded tube because of the cylindrical shape. A complete axial withdrawal of the clutch tube from the guide tube or of the threaded tube from the clutch tube may also be prevented and a permanent connection that cannot be detached in normal handling is guaranteed. This is effected by rotation-preventing ridges which are most easily produced.

A very important refinement of the invention is an arrangement that this guarantees that no axial compression force can be exerted on the rotation-preventing ridges by the threaded spindle or the thread engagement between the threaded spindle and the threaded tube, which could lead to damage to the positive clutch connections. Specifically, an inventive construction assures that the thread engagement between the threaded tube and the threaded spindle is separated when the threaded tube assumes its greatest possible axial distance from the guide tube permitted by the clutch tube.

Another refinement of the invention makes it possible to enlarge the maximum compressive stroke to approximately twice the length of the threaded spindle, or to shorten the spindle to about half the length of the spindle with the same maximum compression stroke, so that when the threaded tube has reached the maximum insertion into the guide tube, it does not extend out of the threaded tube at the front.

In one embodiment, the thread engagement between the threaded spindle and the hollow spindle or between the hollow spindle and the threaded tube does not unintentionally disengage, and a refinement of the invention offers the possibility, when needed, of unscrewing the threaded spindle completely from the hollow spindle, for example, with increased expenditure of power.

It is also possible with an inventive constructon to guarantee that no axial thrust forces or compressive forces can be exerted by the two thread engagements on the rotation-preventing ridges that are also present here on the guide tube and on the clutch tube, which can be achieved by appropriate length ratios.

To guarantee high security against rotation between the guide tube and the threaded tube also with a design of the spring compressor that is as compact and as light as possible at the same time, which is distinguished also by small wall thicknesses, especially of the guide tube and of the clutch tube, other refinements of the invention are provided. Also the constructions make it easier to assemble and disassemble the spring compressor. A torque overload clutch provided for makes it possible with adequate reliability to prevent an overload of the threaded spindle and thus also to achieve a further reduction of the danger of accident.

Accordingly it is an object of the invention to provide an improved spring compressor for large coil springs which includes first and second loose disc-like pressure plates which are located at spaced locations along the axis of a guide tube and which each have a central bore opening and including a threaded spindle which has a spindle head with a key profile being rotatably mounted in the guide tube by means of an axial thrust bearing and wherein the guide tube has a radial support surface supporting the lower pressure plate and it carries a cylindrical threaded tube which has internal threads engaged with the spindle so as to prevent axial mobility therebetween and wherein the threaded tube has an end which is disposed in a direction away from the spindle head with a plurality of radial fingers engaged into recesses formed on the first pressure plate, the first pressure plate having recesses with radial enlargements that form passages for the radial fingers of the threaded tube which is rotatable so that it can be brought into rotationally fixed tensile connection with the pressure plate.

A further object of the invention is to provide an improved spring compressor which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, the invention embodied therein comprises a spring compressor for large coil springs especially for motor vehicle axle springs.

The spring compressor illustrated in FIGS. 1 to 8 inclusive comprises two disk-shaped pressure plates 1 and 2, a cylindrical threaded tube 3, a threaded spindle 4 that can be screwed into the threaded tube 3, and a cylindrical guide tube 5 in which the threaded spindle 4 is mounted to rotate by means of an axial thrust bearing 6. The threaded tube 3 at its bottom end section facing the axial thrust bearing 6 has an internal thread 7 (see FIGS. 5 and 7) that extends over approximately one-fourth of the total length of the threaded tube 3 and into which the threaded spindle 4 can be screwed.

Figure 5:
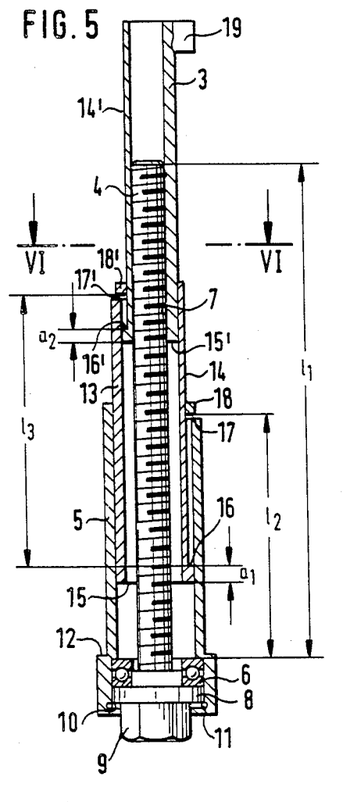
FIG. 5 is a cross sectional view without the two pressure plates of a spring compressor of FIG. 1.
Figure 6:
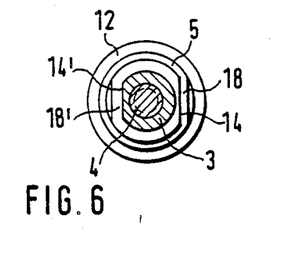
FIG. 6 is a section taken along line VI—VI from FIG. 5.

As shown in FIG. 5, the threaded spindle at the bottom is provided with a flanged ring supported on the axial thrust bearing 6 and with a spindle head 9 having a wedge profile projecting axially from the guide tube 5, and is secured by a safety ring 11 resting in an annular groove 10 in the guide tube 5 against axial motion in the guide tube 5. In the vicinity of the spindle head 9, the guide tube 5 is provided with a radially projecting support surface 12 in the form of an annular shoulder on which the lower pressure plate 2 on the spindle head side can be placed, as described in detail below.

Figure 7:
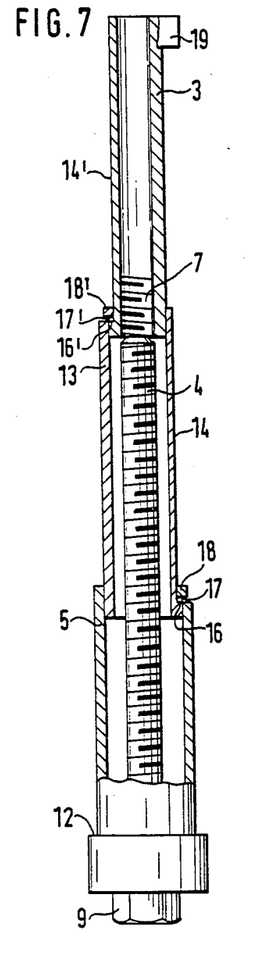
FIG. 7 is a sectional view similar to FIG. 5 of the spring compressor of FIGS. 1 and 5 without the two pressure plates and with the threaded tube fully extended.

As best seen from FIGS. 5 and 7, the guide tube 5 in this spring compressor is approximately half as long as the threaded spindle 4. Between the cylindrical guide tube 5 and the likewise cylindrical threaded tube 3 there is a likewise cylindrical clutch tube 13, which serves to join the guide tube 5 and the threaded tube 3 to one another rotationally, so that the one cannot rotate relative to the other. For this purpose, the clutch tube 13 is provided on its circumference with a flat rotation-preventing surface 14 extending essentially over its entire length, that ends at a distance $a_1$ from the bottom face 15, i.e., the face extending into the guide tube 5, at a stopping surface 16 with the shape of a circular section. The guide tube 5 at its top end is provided with a rotation-preventing ridge 18 free-cut by a transverse incision 17 and punched radially inward, resting flat on the rotation-preventing surface 14, that not only prevents rotation of the clutch tube 13 in the guide tube 5 because of its fit against the rotation-preventing surface 15, but also prevents the clutch tube 13 from being withdrawn completely out of the guide tube 5, when the stopping surface 16 strikes this rotation-preventing ridge 18. A rotation-preventing device is also provided in a similar way between the clutch tube 13 and the threaded tube 3, by providing the threaded tube 3 likewise with a rotation-preventing surface 14' against which fits a rotation-preventing ridge 18' located at the top end of the clutch tube 13, free-cut by a transverse incision 17' and punched inward. The rotation-preventing surface 14' also extends essentially over the entire length of the threaded tube 3 and ends at a distance $a_2$ from the bottom face 15' of the threaded tube 3, at a stopping surface 16' that has the shape of a circular section in top view. The rotation-preventing ridge 18' in this case also prevents the complete withdrawal of the threaded tube 3 from the clutch tube 33, when the stopping surface 16' comes to rest against the rotation-preventing ridge 18'.

As best seen from FIG. 7, the length of the clutch tube 13, or more precisely the axial distance $l_3$ between the stopping surface 16 on the one hand and the rotation-preventing ridge 18' on the other, is chosen, i.e., it is adapted to the length of the threaded spindle 4, in such a way that the threaded spindle 4, during the outward excursion of the threaded tube 3, leaves its internal thread 7 before the stopping surfaces 16 and 16' simultaneously come to rest against the rotation-preventing ridges 18 and 18'. This assures that these rotation-preventing ridges 18 and 18' cannot be exposed to any axial thrust forces or tensile forces for the threaded engagement between the threaded spindle 4 and the threaded tube 3. To guarantee this, the following condition must be met between the spindle length $l_1$, the maximum stroke motion $l_2$ that the clutch tube 13 can execute within the guide tube 5, the axial distance $l_3$ of the stopping surface 16 from the opposite rotation-preventing ridge 18', and the distance of the beginning of the internal thread 7 of the threaded tube 3 from the stopping surface 16': $l_1 = l_2 - a_1 + l_3 - a_2$, with the distance of the stopping surface 16' from the beginning of the thread lying in the plane of the face 15' of the internal thread 7 in the present case being accidentally equal to $a_2$. It is to be understood that when the beginning of the internal thread 7 lies above the stopping surface 16', the algebraic sign of $a_2$ changes.

Figures 1, 2, 3, 4, 8:
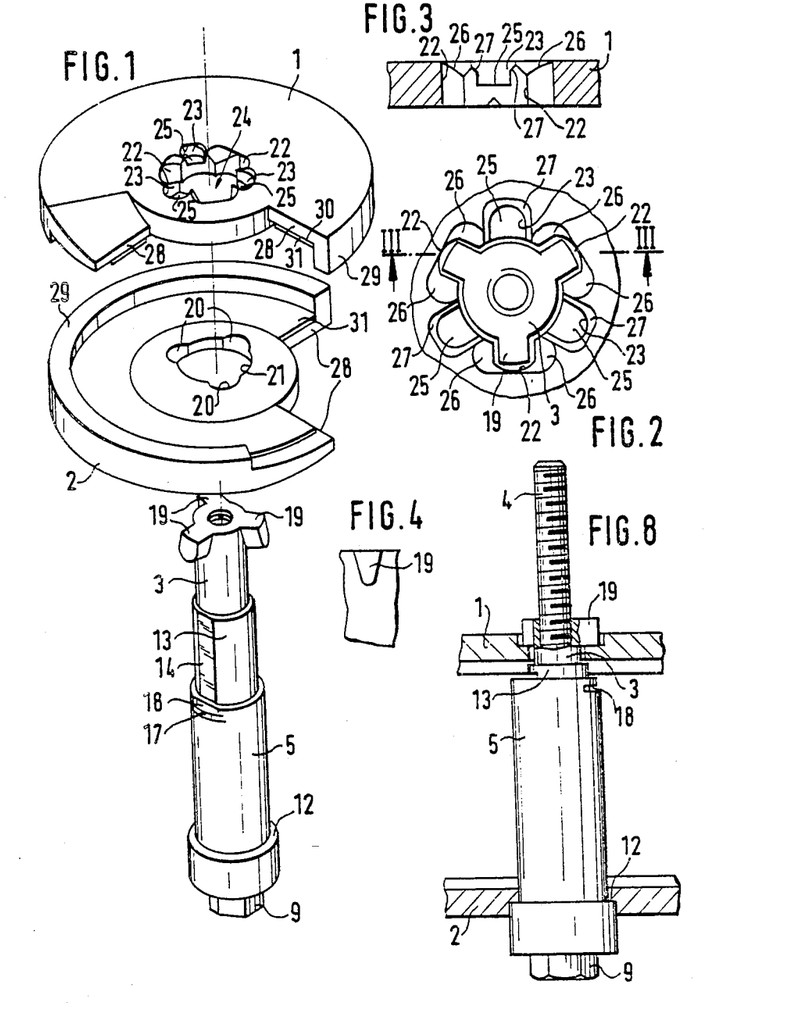
FIG. 1 is an exploded perspective view of a first form of embodiment of a spring compressor constructed in accordance with the invention.
FIG. 2 is a partial plan view of an edge area of the bore opening of the pressure plate away from the spindle head.
FIG. 3 is a section taken along line III—III of FIG. 2.
FIG. 4 is a partial side view of the radial finger of the threaded tube.
FIG. 8 is a side elevational view of the spring compressor of FIGS. 1 to 7 with a completely retracted threaded tube and the smallest possible axial separation of the two pressure plates in the compression position.

As is apparent from FIG. 1, the pressure plate 2, that rests against the support surface 12 of the guide tube 5 when using the spring compressor and is then located in the vicinity of the spindle head, has a central bore as an opening, whose diameter is only slightly larger than the outside diameter of the guide tube 5, but that is smaller than the outside diameter of the support surface 12. This central bore 21 is also provided with three enlargements 20, each at angular distances of 120° from the other, through which three radial fingers 19 can pass freely, which are located on the upper end of the threaded tube 3, i.e., at the end away from the spindle head, i.e., they are likewise positioned at angular distances of 120°. These radial fingers 19 are provided to produce an anti-rotational tensile connection between the pressure plate 1 and the threaded tube 3. For this purpose, the pressure plate 1 is also provided with a central opening, which in the example of embodiment has the basic are provided to produce an anti-rotational tensile connection between the pressure plate 1 and the threaded tube 3. For this purpose, the pressure plate 1 is also provided with a central opening, which in the example of embodiment has the basic shape of a cylindrical bore, but which also, for example, could have the basic shape of an equilateral triangle with a width adapted to the diameter of the threaded tube 3. As passages for the radial fingers 19, this opening 24, like the central bore 21 of the pressure plate 2, has radial enlargements 22 passing through it axially whose angular distances from one another are likewise each 120°, and whose width and radial extent are each somewhat larger than the corresponding dimensions of the radial fingers 19. On the outside of the pressure plate 1 visible in FIGS. 1 and 2 there are axial depressions 23 with flat, planar support surfaces 25 in the edge area of the bore opening 24, in each case in the center between two enlargements 22, that serve to hold positively the radial fingers 19 of the threaded tube 3 and thus to make a rotationally fixed tensile connection between the pressure plate 1 and the threaded tube 3. To eliminate the risk of accident, steps must be taken to guarantee that the radial fingers 19 cannot be supported to make a tensile connection anywhere other than on the support surfaces 25 of the axial depressions 23. To achieve this, both the edges of the axial depressions 23 and the edges of the radial enlargements 22 on the outside are countersunk obliquely in each case in such a way that conical guide surfaces 26 and 27 are formed that extend to one another or overlap at least in the radial range of the radial fingers 19, so that in this area, there is no planar, flat support surface for the radial fingers outside of the depressions 23.

In addition, the radial fingers 19, as shown by the side view of FIG. 4, are essentially wedge-shaped in design, so that they have only the two possibilities of sliding either into one of the depressions 23 or into an axial enlargement when they are moved axially from the outside toward the pressure plate 1.

In other respects, the two pressure plates 1 and 2 have essentially the same mirror-image designs. Both have the basic shape of a circular disk, each with a cutout 8 in the form of the segment of a ring extending over approximately 70°–90° that serves for the passage of a section of spring winding. Their outer surfaces turned away from one another are smooth in each case. On each of the inner faces facing one another, inside an annular collar 29 encircling the outer edge, there are annular surfaces 30 wound slightly helically, each of which is provided with a friction lining 31 in the form of a rubber band cemented on or vulcanized on.

The manipulation and use of such a spring compressor is explained in detail below with reference to FIGS. 9, 10, and 11.

Figure 9:
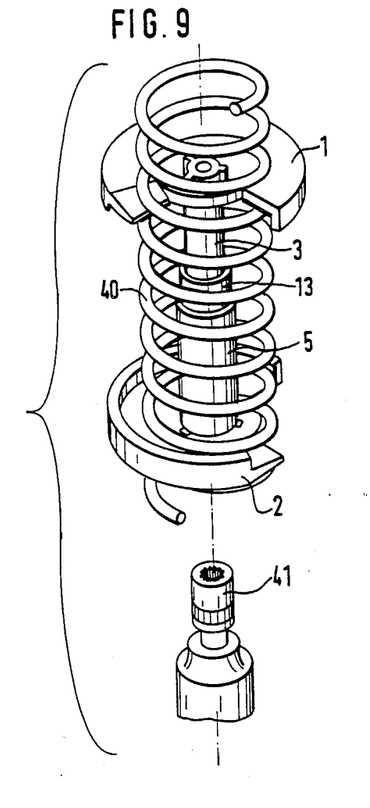
FIG. 9 is an expanded perspective illustration of the spring compressor shown in FIGS. 1 to 8 when used with a coil spring.

FIG. 9 shows a coil spring 40 already removed from a motor vehicle, or not yet installed, in which the spring compressor described above has already been inserted ready for compression. It is inserted by first inserting the pressure plates 1 and 2 separately in the manner illustrated between two turns of the coil spring 40 from the side until they have assumed a position approximately concentric to the turns of the spring. The compression unit consisting of the threaded tube 3, the threaded spindle 4, the guide tube 4, and the clutch tube 13 was then passed through from the bottom in the axial direction, first through the bottom pressure plate 2 and then through the upper pressure plate 1, to set the three radial fingers 19 in the depressions 23 in the upper pressure plate 1. In the position thus reached, the threaded spindle 4 can then be rotated by means of a rotating tool provided with a key head 41, which is placed on the spindle head 9, so that the distance between the plates is reduced and the turns of the coil spring 40 between the pressure plates 1 and 2 are pushed together. Depending on the number of spring turns between the pressure plates 1 and 2, they can be pressed together to the maximum extent so that they contact one another. The coil spring 40, for example in the manner shown in FIG. 10, can then be inserted in a motor vehicle between a bottom support plate 42 and a top support disk 43, and can be relieved of pressure by appropriate rotation of the threaded spindle 4 until the turn of the coil spring 40 lying outside of the upper pressure plate 1 rests against the support disk 43, and the two pressure plates 1 and 2 are no longer exposed to spring pressure. The threaded tube 3 is then pushed upward by turning the threaded spindle 4 further until the radial fingers 19 are raised out of the depressions 23 and can be withdrawn downward through the pressure plates 1 and 2 after a rotation of the threaded tube 3 of 60°. The two pressure plates 1 and 2 can then be withdrawn laterally from the coil spring 40. It can be seen in FIG. 10 that the support plate 42 is provided with a central opening 42', so that the compressor unit, i.e., the guide tube 5 with the threaded tube 3 can be withdrawn downward through the support pan 42.

Figure 11:
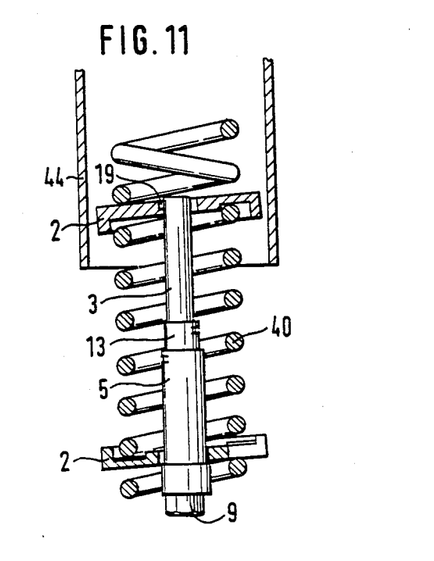
FIG. 11 is a sectional view of another applied example of the spring compressor shown in FIGS. 1 to 8 with a compression spring of a motor vehicle extending partly into a so-called dome.

In the example of embodiment illustrated in FIG. 11, the coil spring 40, when it is relieved of pressure, extends into a dome 44 present in the vehicle. While the compression unit can be withdrawn from the two pressure plates 1 and 2 in the manner described above, and the lower pressure plate 2 can also be withdrawn laterally from the coil spring, it is necessary to rotate the upper pressure plate 1 along the turns downward until it has left the dome 44 and can likewise be withdrawn laterally.

Figure 10:
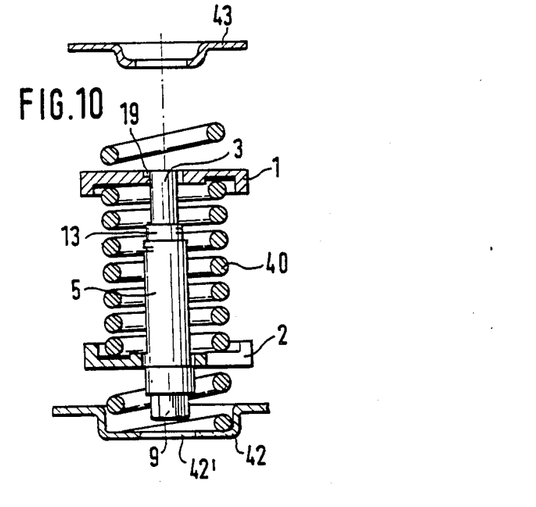
FIG. 10 is a sectional illustration of the spring compressor of FIGS. 1 to 8 with the compressed spring.

It can be seen particularly in FIGS. 8 and 10 that the distance between the two pressure plates 1 and 2 when compressing a coil spring can be shortened until the lower edge of the opening 24 rests on the upper face 32 of the guide tube 5.

Figures 12, 14, 15:
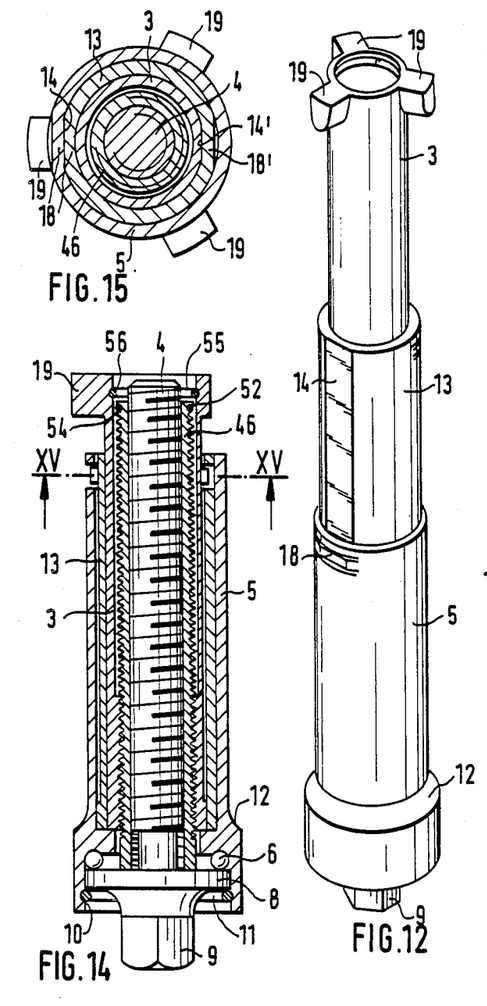
FIG. 12 is a perspective side view of another form of embodiment of a spring compressor without the two pressure plates.
FIG. 14 is a view similar to FIG. 13 of the spring compressor of FIGS. 12 and 13 in slightly enlarged illustration with completely retracted threaded tube, likewise without the two pressure plates.
FIG. 15 is a cross section taken along line XV—XV from FIG. 14 in enlarged illustration.
Figure 13:
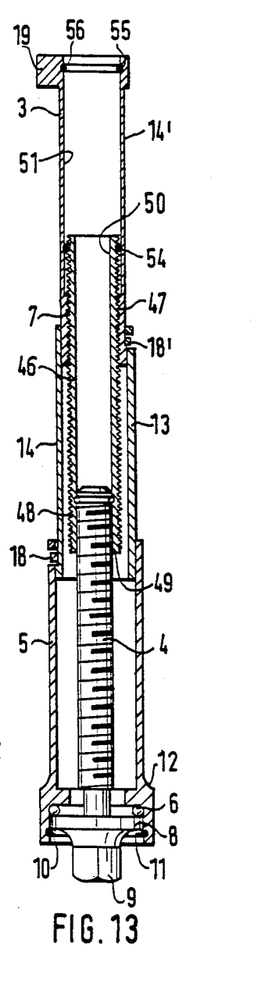
FIG. 13 is a cross section of the spring compressor of FIG. 12 in with partly extended threaded tube.

While it is inconvenient in many types of motor vehicles that the threaded spindle 4 in the spring compressor described above extends out of the upper pressure plate 1 by a distance that corresponds at least approximately to the length of the guide tube 5 and thus to half the length of the threaded spindle 4, a spring compressor is provided for in FIGS. 12 to 15 with a compression unit for the two pressure plates 1 and 2 that does not have this drawback. In this compression unit, that likewise consists of the guide tube 5, the threaded tube 3, with the three radial fingers 19 and the clutch tube 13, the threaded spindle 4 is longer than the guide tube 5 only by the length by which the threaded tube 3 extends from the guide tube 5 in the axial direction when it is retracted to the maximum in the guide tube 5. This operating position is shown in FIG. 14. While the guide tube 5 is connected to the threaded tube 3 by the clutch tube 13 in the same way as described above with reference to FIGS. 1 to 8, a hollow spindle 46 is positioned between the threaded spindle 4 and the threaded tube 3 provided with the internal thread 7 in its bottom end section. This hollow spindle 46 has approximately the same axial length as the threaded spindle 4, it is provided with an external thread extending essentially over its entire length that is engaged with the internal thread 7 of the threaded tube 3, and it has an internal thread 48 at its lower section that extends in the axial direction from the bottom face 49 over at least five turns. A cylindrical bore 50 is provided above this internal thread 48, whose diameter is somewhat larger than the outside diameter of the threaded spindle 4.

The section of the threaded tube 3 above the internal thread 7 is also provided with a cylindrical bore 51 whose diameter is slightly larger than the outside diameter of the hollow spindle 46.

The end section of the threaded spindle 4 extending into the cylindrical bore 50 is provided with a thread safety device 52, for example in the form of a plastic or rubber ring inserted into an annular groove 53, whose task is to prevent the threaded spindle 4 from being screwed out directly downward from the inner thread 48 of the hollow spindle 46. In the same way, a thread safety device 54 is attached to the upper end section of the hollow spindle 46 that prevents the hollow spindle from being unscrewed downward directly out of the threaded tube 3. In both cases, the thread safety device 52 or 54 is attached so that the axial motion of the threaded tube 3 on the hollow spindle 46 or the axial motion of the threaded spindle 4 in the hollow spindle 46 is not hindered.

This hollow spindle 46 makes it possible to enlarge substantially the maximum compression stroke in comparison with the length of the threaded spindle 4, by the length by which the threaded tube 3 can be moved on the hollow spindle 46 itself.

To prevent the hollow spindle 46 from being able to be unscrewed upward out of the internal thread 7 of the threaded tube 3, a blocking ring 56 is positioned at the upper end of the threaded tube 3 in an internal annular groove 55, through which the hollow spindle 7 cannot be pushed.

It is obvious that because of the arrangement of the hollow spindle 46, the diameter of the guide tube 5, of the clutch tube 13, and of the threaded tube 3, with the same diameter of the threaded spindle 4 as in the example of embodiment of FIGS. 1 to 8, must be larger by twice the wall thickness of the hollow spindle 46. On the other hand, the substantially more significant advantage is obtained that the overall length of the compression unit or of the spring compressor in the form of embodiment of FIGS. 12 to 15, as made clear by FIG. 14, can be substantially shorter when shortened to the maximum than in the other example of embodiment, while the maximum compression stroke is substantially larger.

Figure 16:
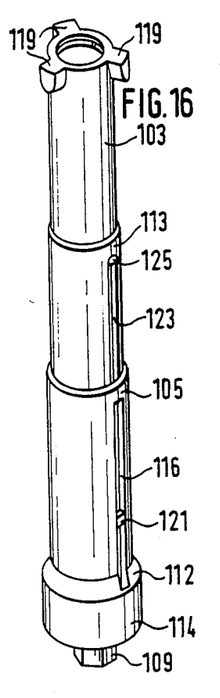
FIG. 16 is a perspective side view of another form of embodiment of the spring compressor.

All of the other beneficial characteristics of the spring compressor illustrated in FIGS. 1 to 8 can naturally also be implemented in the example of embodiment of FIGS. 12 to 15. In the case of the spring compressor illustrated in FIGS. 16, 17, and 18, that likewise consists of a threaded tube 103 with three radial fingers 119, a clutch tube 113, and a guide tube 105 with a support surface 112, and of a threaded spindle 104 with a spindle head 109 having a wedge profile, rotation is prevented between the guide tube 105 and the threaded tube 103 by means different from those in the examples of embodiment described above.

Figure 17:
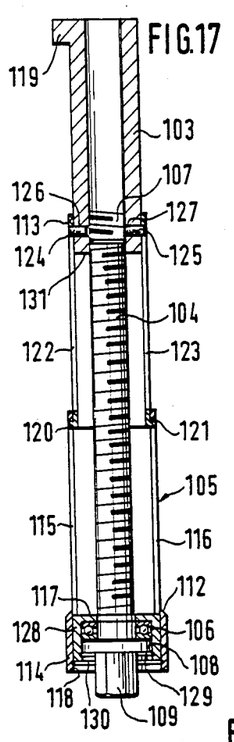
FIG. 17 is a longtiudinal cross section in the condition of its greatest length of the spring compressor of FIG. 16.
Figures 19, 20, 21:
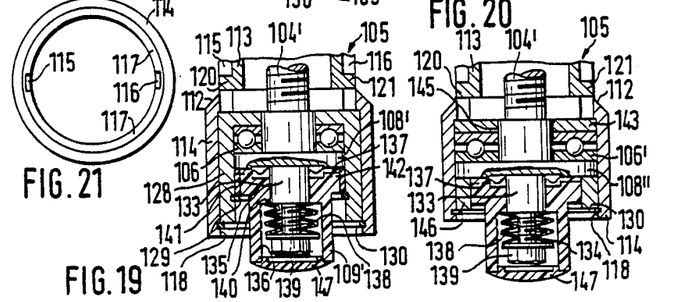
FIG. 19 is a section of the spring compressor at the spindle head with a torque overload clutch between a wedge head profile and the threaded spindle in cross section.
FIG. 20 is a sectional view of a mounting of the spindle head in the bearing bushing of the guide tube modified from FIG. 19.
FIG. 21 is an end plan view of the bearing bushing of the empty guide tube.
Figure 22:
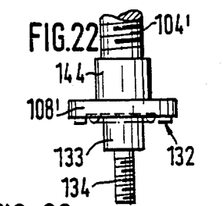
FIG. 22 is an elevational view of the end section of the threaded spindle toward the spindle head in the form of embodiment of FIGS. 19 and 20.

The guide tube 105 provided with a bearing bushing 114 at the bottom end is provided with two diametrically opposite guide slots 115 and 116 closed at the upper end of the guide tube 105, which end, as best seen from FIGS. 17 and 21, open at an annular shoulder 117 of a cylindrical recess 118 in the bearing bushing 114. The inside diameter of the recess 118 is at least as large as the outside diameter of the guide tube 105 above the bearing bushing 114. The clutch tube 113 at its end next to the spindle head has two guide cams 120, 121 molded integrally with it, each of which runs in one of the guide slots 115 and 116 with small lateral clearance, and whose radial extent is equal to the wall thickness of the guide tube 105 at the most. Both the guide tube 105 and the clutch tube 113 are completely cylindrical, with the outside diameter of the clutch tube 113 being adapted to the inside diameter of the guide tube 115 so that good telescoping is achieved between the two tubes. The clutch tube 113 is introduced into the guide tube 105 by pushing the clutch tube 113 from the bottom through the cylindrical recess 118 into the guide tube 106, so that the two guide slots 115 open at the bottom hold the two guide cams 120 and 121. The clutch tube 113 is also provided with two diametrically opposite guide slots 122, 123 running axially, but they are closed at both the top and bottom ends of the clutch tube 113. To achieve the most compact and lightest design possible, the wall thickness of both the guide tube 105 and the clutch tube 113 are kept small. They amount to approximately 2–3 mm. On the other hand, the end section toward the spindle head provided with an internal thread 107 and the threaded tube 103 subject to tension are provided with a larger wall thickness of approximately 5–6 mm. This wall thickness of the threaded tube 103 is sufficient to fasten two guide pins 124 and 125 in it, which are pressed into coaxial crossbores 126 in the bottom end section of the threaded tube 103 provided with the internal thread 107. Two heavy dowel pins of rolled spring steel pressed into one another are used as guide pins 126, 127, which are driven into the crossbores 126 and 127 through the guide slots 122 and 123, so that they extend out of the circumferential surface of the threaded tube 103 only by the wall thickness of the clutch tube 113 at the most, and thus make an anti-rotational connection between the threaded tube 103 and the clutch tube 113. The length of the guide pins 124 and 125 is chosen so that they do not engage in the internal thread 107 of the threaded tube 103 when they extend out of the circumferential surface of the threaded tube 103 by the wall thickness of the clutch tube 113. At the same time, this arrangement and the chosen length of the clutch pins 124 and 125 result in the possibility of driving them out of the crossbores 126 and 127 toward the inside when the threaded spindle 104 is unscrewed from the internal thread 107 as far as shown in FIG. 17, by means of an appropriate driving pin, when the threaded tube 103 is to be released from the clutch tube 113.

Figure 18:
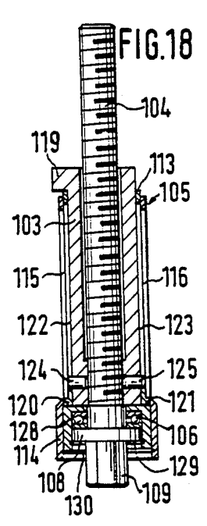
FIG. 18 is a condition of its shortest length of a longtiudinal section through the spring compressor of FIGS. 16 and 17.

In the example of embodiment illustrated in FIGS. 17 and 18, the threaded spindle 104 is provided integrally with a flanged ring 108 that rests on an axial bearing 106 and to which is integrally connected the wedge profile of the spindle head 109, in the same way as in the examples of embodiment of FIGS. 1 to 15 described above.

In order not to have to choose the diameters of both the flanged ring 108 and the axial bearing 106 to be as large as the inside diameter of the recess 118 of the bearing bushing 114, a cup-shaped cylindrical bearing bushing 128 is used in the recess 118, which rests on the annular shoulder 117 and in which both the axial bearing 106 and the flanged ring 108 are held and secured in axial direction by a safety ring 129. The bearing bushing 128 resting loose in the recess 118 of the bearing bushing 114, that should be easy to insert and take out, is fastened axially in the recess 118 by means of a locking ring 130. The two guide slots 115 and 116 of the guide tube 105 are closed by the bearing bushing 128, so that the clutch tube 113 with the bearing bushing 128 inserted cannot be pushed out downward.

It can be seen from FIG. 18 that in this spring compressor also, the clutch tube 113 and the threaded tube 103 telescope into one another and can be pushed into the guide tube 105 until the inner face 131 of the threaded tube 103 rests on the bearing bushing 128. In this position, the axial distance of the support surface 112 from the radial fingers 119 is approximately the same as the distance of the radial fingers 119 from the bottom face 131 of the threaded tube 103. This distance corresponds to approximately one-third of the maximum distance shown in FIG. 17 between the support surface 112 and the radial fingers 119 that is reached when the guide cams 120 and 121 are at the upper ends of the guide slots 115 and 116 and the guide pins 124 and 125 are at the upper ends of the guide slots 122 and 123, and the threaded tube 103 is therefore at its maximum excursion.

To prevent the threaded spindle from turning too far and thus damaging the threads in these extreme positions of the threaded tube 103 relative to the guide tube 105 illustrated in FIGS. 17 and 18, according to FIGS. 19, 20, and 21 a threaded spindle 104' is provided, whose wedge profile head 109' is connected to it by a torque overload clutch. The threaded spindle 104' for this reason has a flanged ring 108' that is provided with a ratchet crown gear 132 on the face pointing outward, and a cylindrical guide neck 133 outside of the flanged ring 108', to which is connected a threaded peg 134. The wedge profile head 109' is provided with a central bore adapted in diameter to the guide neck 133 and with a cylindrical recess 136 enlarged in diameter that can be sealed with a plastic cap 137. The wedge profile head 109' is also provided with a counterratchet crown gear 137 latching into the ratchet crown gear 132, which is kept engaged by a stack of cup springs 138 that is placed on the threaded peg 134 between a threaded nut 139 and the annular shoulder 140 of the recess 136. In the form of embodiment of FIG. 19, the flanged ring 108' and the axial bearing 106 have the same diameters as in the example of embodiment of FIGS. 17 and 18, and they are held in the same way in a bearing bushing 128. However, a spacer bushing 141 that bridges over in the axial direction the enlarged shoulder 142 of the wedge profile head 109', is necessary for the axial position fastening of the flanged ring 108', so that the safety ring 129 can be inserted and taken out directly.

Here also, the bearing bushing 128 is secured in the recess 118 in the bearing bushing 114 by a safety ring 130.

In the example of embodiment of FIG. 20, instead of the bearing bushing 128, only a bearing disk 143 is provided that is adapted in diameter to the recess 118, on which rests an axial bearing 106' on which is supported a flanged ring 108". Both the axial bearing 106' and the flanged ring 108" in this case are adapted to the inside diameter of the recess 118, but this is not absolutely necessary. Because of the fact that the threaded spindle 104' can run centered through a cylindrical neck 144 in the central bore 145 of the bearing disk 143, the axial bearing 106' and the flanged ring 108" likewise running on the cylindrical neck 144 require no guidance on the inner surface or the recess 118. On the other hand, a spacer bushing 146 is also necessary in this case to secure the axial position of the threaded spindle 104'. This spacer bushing 146 rests on the flanged ring 108" and is fixed in the recess 118 by the saftey ring 130. All of the other components are provided in the same arrangement as in the example of embodiment of FIG. 19.

The presence of the torque overload clutch described above, which can be adjusted to different limiting values with the help of the adjusting nut 139 and the spring stack 138, guarantees that no overturning of the threaded spindle can occur in the two end positions of the threaded tube 103 relative to the guide tube 105 illustrated in FIGS. 17 and 18, and thus no damage to the threads engaged with one another. If the wedge profile head 109' is turned further in one of the two end positions of the threaded tube 103, rotation of the wedge profile head 109' relative to the threaded spindle 104' occurs, by the two ratchet crown gears 132 and 137 engaged with one another mutually disengaging with a simultaneous axial motion of the wedge profile head 109' overcoming the axial spring forces of the stack of cup springs 138. So that this overload clutch is equally effective in both directions of rotation, each of the two ratchet crown gears 132, 137 is provided with symmetrical tooth profiles.

With the described type of anti-rotational connection between the guide tube 105 and the threaded tube 103, high strength is produced even with small wall thicknesses of both the guide tube 105 and the clutch tube 113, particularly because the guide cams 115, 116 of the clutch tube 113 are formed on it integrally, i.e., they can be machined out of the solid material, and there is adequate wall thickness for the guide pins 124, 125 on the threaded tube 103 anyhow for a stable press fit. The requirement of easy assembly and disassembly is also met in a beneficial manner.

For stability reasons, it is advisable to position the guide cams 120, 121 displaced relative to the guide slots 122, 123 on the clutch tube, for example by 90° in each case.

What is claimed is:

1. A spring compressor, comprising a cylindrical guide tube having a first end with an exterior ledge and an opposite open second end, an internally threaded tube telescopically movable relative to said guide tube and having an outer end with at least three radially extending fingers thereon, first and second pressure plates surround said guide cylinder, said first pressure plate having an exterior surface with a plurality of recesses of a number and of a location corresponding to said fingers into which said fingers engage and also having bore hole enlargements between said recesses defining oblique faces providing no planar support for said fingers, said cylindrical guide tube having an exterior ledge on which said second pressure plate engages, a threaded spindle having an exterior engageable end extending out of said cylindrical guide tube and being rotatably supported in said cylindrical guide tube and having an exterior thread threadably engaging said interiorally threaded tube and being rotatable to shift said interiorally threaded tube axially relative to said cylinder.

2. A spring compressor according to claim 1, wherein said radial fingers extend outwardly from the circumference of said threaded tube at substantially equal angular spacing from one another.

3. A spring compressor according to claim 1, wherein said first pressure plate has a central bore hole through which said threaded spindle extends and wherein said pressure plate has a width that is only slightly larger than the outside diameter of said threaded tube and it is smaller than the diameter of said guide tube.

4. A spring compressor according to claim 1, including a clutch tube surrounding said spindle and said threaded tube located between said threaded tube and said cylindrical guide tube and being connected with said threaded tube for rotation therewith in respect to said cylindrical guide tube but being movable axially relative to each of said threaded tube and said cylindrical guide tube.

5. A spring compressor according to claim 4, wherein said clutch tube and said threaded tube have at least one flat rotation preventing surface extending over its entire length on its cylindrical circumference and including a rotation preventing ridge of said guide tube that extends radially inwardly and fits against a rotation prevention surface of said clutch tube and a rotation prevention ridge of said clutch tube extends inwardly fitting against the rotation preventing surface of said threaded tube.

6. A spring compressor according to claim 5, wherein each of said rotation preventing surfaces is provided with a stopping face at its end facing said axial bearing of said threaded spindle, said face striking against adjacent rotation preventing ridge.

7. A spring compressor according to claim 5, wherein said rotation preventing ridges are formed of free cut wall sections punched inward at an end of said guide tube and said clutch tube away from said spindle head.

8. A spring compressor according to claim 4, wherein said threaded spindle has a thread equal to the sum of the maximum stroke of said clutch tube and said guide tube and there is an axial separation of a stopping face of said rotation prevention surface of said clutch tube from this rotation preventing ridge which is reduced by an axial separation of said stopping face of the rotation preventing surface of the treaded tube from the beginning of the internal thread.

9. A spring compressor according to claim 1, including a hollow spindle threadably connected between said spindle and said threaded tube having an internal thread engaged with the threaded spindle and an external thread engaged with said internal thread of said threaded tube.

10. A spring compressor according to claim 9, wherein said internal thread of both the threaded tube and said hollow spindle extends only over a short section of the associated part and wherein said threaded spindle and said hollow spindle is provided with a thread guard against unscrewing of a particular internal thread of said threaded tube and said hollow spindle.

11. A spring compressor according to claim 10, wherein said thread guards comprise a ring which can be deformed under increased force from a particular counterthread.

12. A spring compressor according to claim 4, wherein said tube is provided with at least one axial guide slot having one end which is closed at the end of said tube away from said spindle head, a guide cam running in said end located at the end section of said clutch tube away from said spindle head, said clutch tube being provided with at least one axial guide slot closed at each end of said clutch tube, a guide pin running in said guide slot fastened to the end section of said threaded tube away from said spindle head.

13. A spring compressor according to claim 12, wherein said guide tube and said clutch tube each have two diametrically opposite guide slots, said coupling tube being provided with at least two diametrically opposite guide cams and said threaded tube being provided with two diametrically opposite guide paths.

14. A spring compressor according to claim 12, wherein said guide path is fastened to said threaded tube on the spring action in a detachable manner.

15. A spring compressor according to claim 14, wherein said each of said guide pins comprise two heavy dowel pins force-fitted into one another, each of said pins being pressed into radial bores of said threaded tube.

16. A spring compressor according to claim 14, wherein said guide pins are shorter than the inside diameter of said threaded tube.

17. A spring compressor according to claim 12, wherein said guide slots of said guide tube end open toward said spindle head, a bearing bushing on which the interior of said spindle head is located for said guide tube holding the axial thrust bearing of said threaded spindle.

18. A spring compressor according to claim 17, wherein the open ends of said slots of said guide tube are closed by a bearing sleeve, a bearing ring resting on an annular shoulder of said bearing bushing conforming in radial width to the wall thickness of said guide tube.

19. A spring compressor according to claim 1, wherein said threaded spindle and said wedge profile head has a wedge profile which are positively connected to one another by a torque overload clutch.

20. A spring compressor according to claim 9, wherein said flanged ring of a threaded spindle is provided toward its face with a ratchet crown gear, the counteratchet crown gear having a wedge profile head mounted with axial and rotational mobility on a guide neck of the threaded spindle is kept engaged by axial spring forces.

21. A spring compressor according to claim 20, wherein a cylindrical recess in said wedge profile head opens at its front end in a compression spring or a stack of cup springs concentrically around a threaded stem between an adjusting nut screwed into the threaded stem and an annular shoulder of the recess.

* * * * *